US012808897B2

(12) United States Patent
Terasaka et al.

(10) Patent No.: US 12,808,897 B2
(45) Date of Patent: Nov. 24, 2026

(54) COMPOSITE MOLDED COMPONENT

(71) Applicant: Sumitomo Wiring Systems, Ltd., Yokkaichi (JP)

(72) Inventors: Yukitoshi Terasaka, Suzuka (JP); Toshinari Kobayashi, Suzuka (JP); Megumi Yamao, Suzuka (JP); Hiroyuki Koyano, Suzuka (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 293 days.

(21) Appl. No.: 18/832,703

(22) PCT Filed: Jan. 11, 2023

(86) PCT No.: PCT/JP2023/000412
§ 371 (c)(1),
(2) Date: Jul. 24, 2024

(87) PCT Pub. No.: WO2023/145427
PCT Pub. Date: Aug. 3, 2023

(65) Prior Publication Data

US 2025/0102533 A1 Mar. 27, 2025

(30) Foreign Application Priority Data

Jan. 28, 2022 (JP) ................................ 2022-011926

(51) Int. Cl.
*B29C 33/42* (2006.01)
*G01P 1/02* (2006.01)

(52) U.S. Cl.
CPC .................................. *G01P 1/026* (2013.01)

(58) Field of Classification Search
CPC ................................ B29C 33/42; B29C 45/14
See application file for complete search history.

(56) References Cited

U.S. PATENT DOCUMENTS 5,364,292 A * 11/1994 Bethurum .......... H01R 13/6599
439/607.02
2005/0204823 A1* 9/2005 Murai .................. G01L 19/069
73/724
2011/0107835 A1 5/2011 Campbell et al.
(Continued)

FOREIGN PATENT DOCUMENTS

JP 2015-227026 A 12/2015
WO 03-98226 A1 11/2003

OTHER PUBLICATIONS

International Search Report, Application No. PCT/JP2023/000412, mailed Feb. 28, 2023. ISA/Japan Patent Office.

*Primary Examiner* — Sherman Ng
(74) *Attorney, Agent, or Firm* — Brooks Kushman P.C.

(57) ABSTRACT

This composite molded component includes: an internal component that includes an electronic component body (element body portion) and at least one lead wire extending from the element body portion; a primary molded portion covering the internal component; and a secondary molded portion covering the primary molded portion. In this composite molded component, at least a portion of the lead wire is a soldering portion to be soldered to another component (conductor end portion). The primary molded portion includes, in at least a portion of the portion that faces the soldering portion, a recessed portion that forms a gap with the lead wire.

7 Claims, 5 Drawing Sheets

(56) References Cited

U.S. PATENT DOCUMENTS

| | | | | |
|---|---|---|---|---|
| 2014/0320119 | A1* | 10/2014 | Tsuge | G01P 1/026 324/207.25 |
| 2017/0153265 | A1 | 6/2017 | Yamamoto et al. | |
| 2020/0292361 | A1 | 9/2020 | Yamamoto et al. | |
| 2023/0003559 | A1 | 1/2023 | Shimizu et al. | |

* cited by examiner

COMPOSITE MOLDED COMPONENT

CROSS-REFERENCE TO RELATED APPLICATIONS

This application is the U.S. national stage of PCT/JP2023/000412 filed on Jan. 11, 2023, which claims priority of Japanese Patent Application No. JP 2022-011926 filed on Jan. 28, 2022, the contents of which are incorporated herein.

TECHNICAL FIELD

The present disclosure relates to a composite molded component.

BACKGROUND

Vehicles such as automobiles include a wheel speed sensor that measures the rotational speed of a wheel. A device such as that described in JP 2017-096828A is known as an example of such a wheel speed sensor. The wheel speed sensor described in JP 2017-096828A includes a detection unit in which a detection element portion is provided, a holder portion that holds the detection unit, and a resin molded portion that serves as a cover for covering the detection unit. The detection element portion is embedded in one end side of the resin molded portion, and a wire harness extends from the other end side of the resin molded portion.

The detection unit and the holder portion are integrated into a molded body by injection molding or the like, and output electric wire portions of a wire harness are soldered to terminal portions of the detection unit of the molded body.

DISCLOSURE

Here, heat generated during the soldering may affect the holder portion.

In view of this, an object of the present disclosure is to provide a composite molded component in which the effect of heat generated during soldering is reduced.

SUMMARY

A composite molded component according to an aspect of the present disclosure includes: an internal component including an electronic component body and at least one lead wire extending from the electronic component body; a primary molded portion covering the internal component; and a secondary molded portion covering the primary molded portion, wherein at least a portion of the at least one lead wire is a soldering portion configured to be soldered to another component, and the primary molded portion includes, in at least a portion of a portion facing the soldering portion, a recessed portion forming a gap with the at least one lead wire.

Advantageous Effects

According to the present disclosure, it is possible to provide a composite molded component in which the effect of heat generated by a soldering tool is reduced.

DETAILED DESCRIPTION OF PREFERRED EMBODIMENTS

Figure 1:
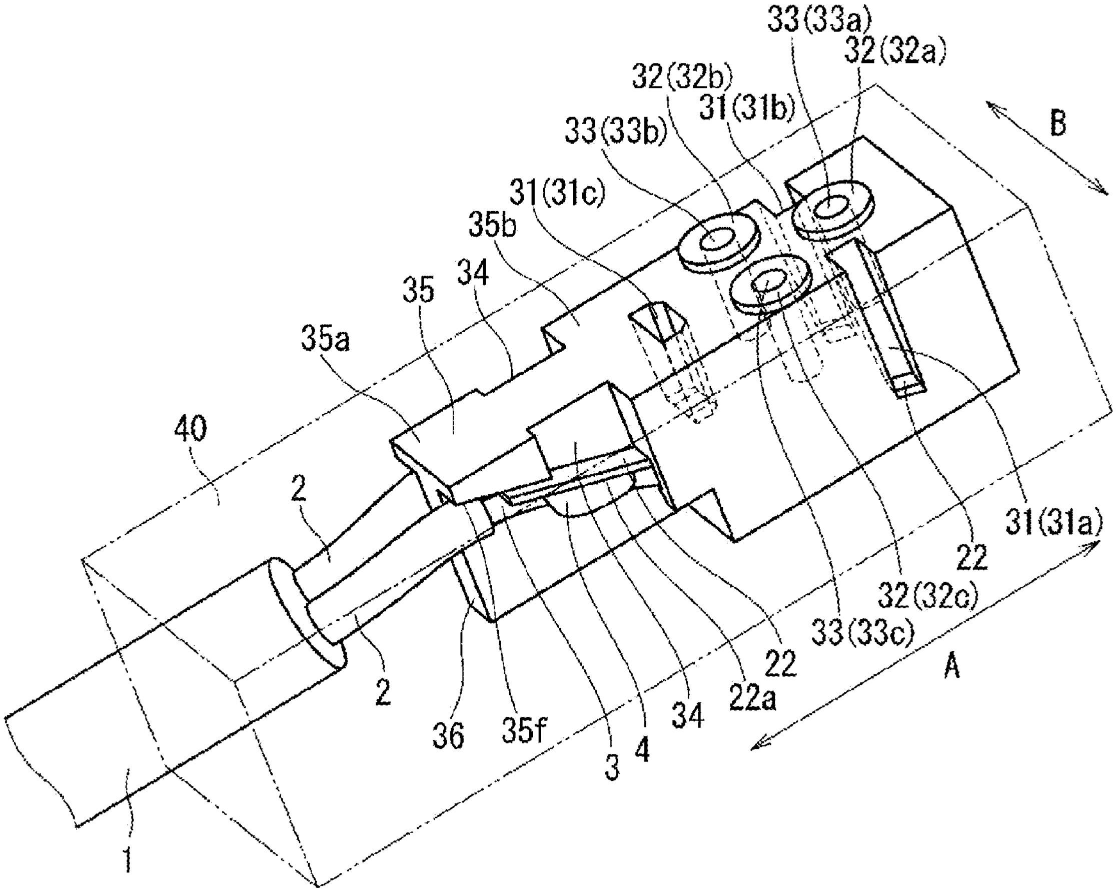
FIG. 1 is a perspective view of a composite molded component.

First, embodiments of the present disclosure will be listed and described.

A composite molded component according to an aspect of the present disclosure is as follows.

A composite molded component includes: an internal component including an electronic component body and at least one lead wire extending from the electronic component body; a primary molded portion covering the internal component; and a secondary molded portion covering the primary molded portion, wherein at least a portion of the at least one lead wire is a soldering portion configured to be soldered to another component, and the primary molded portion includes, in at least a portion of a portion facing the soldering portion, a recessed portion forming a gap with the at least one lead wire.

According to the present disclosure, the effect of soldering heat can be avoided with the recessed portion that forms a gap with the lead wire. This reduces the effect of soldering heat.

An aspect is possible in which the at least one lead wire includes a pair of lead wires, and the primary molded portion includes the recessed portion at each of two outer ends in a width direction perpendicular to a lengthwise direction of the secondary molded portion. According to the present disclosure, the recessed portions are located at the outer ends of the primary molded component in the width direction, and thus the recessed portions can be formed easily. Moreover, the outer ends of the primary molded portion in the width direction are portions that face positions suited to soldering. In other words, the recessed portions are provided at positions particularly likely to be subjected to soldering heat. Therefore, this arrangement of the recessed portions makes it possible to avoid the melting of resin in the portions likely to be subjected to soldering heat.

An aspect is possible in which the recessed portion is formed at a position corresponding to an intermediate portion of the soldering portion. According to the present disclosure, the recessed portions are located at positions likely to be subjected to soldering heat, thus making it possible to avoid the melting of the resin of the primary molded portion.

An aspect is possible in which the primary molded portion includes a leading-end placement portion on which a leading end portion of the at least one lead wire is placeable. According to the present disclosure, the lead wires are supported in a stable state. Therefore, the lead wires can be soldered easily.

Specific examples of a composite molded component of the present disclosure will be described below with reference to the drawings. Note that the present disclosure is not limited to these examples, but rather is indicated by the scope of the claims, and is intended to include all changes within the meaning and scope equivalent to the scope of the claims.

In the drawings, parts of configurations may be exaggerated or simplified for convenience of description. Furthermore, the dimensional ratios of parts may differ among the drawings. Also, in this specification, the terms "parallel" and "orthogonal" do not only mean strictly parallel and strictly orthogonal, but also include approximately parallel and approximately orthogonal to the extent that operations and effect of the present embodiment are achieved.

First Embodiment

Figure 2:
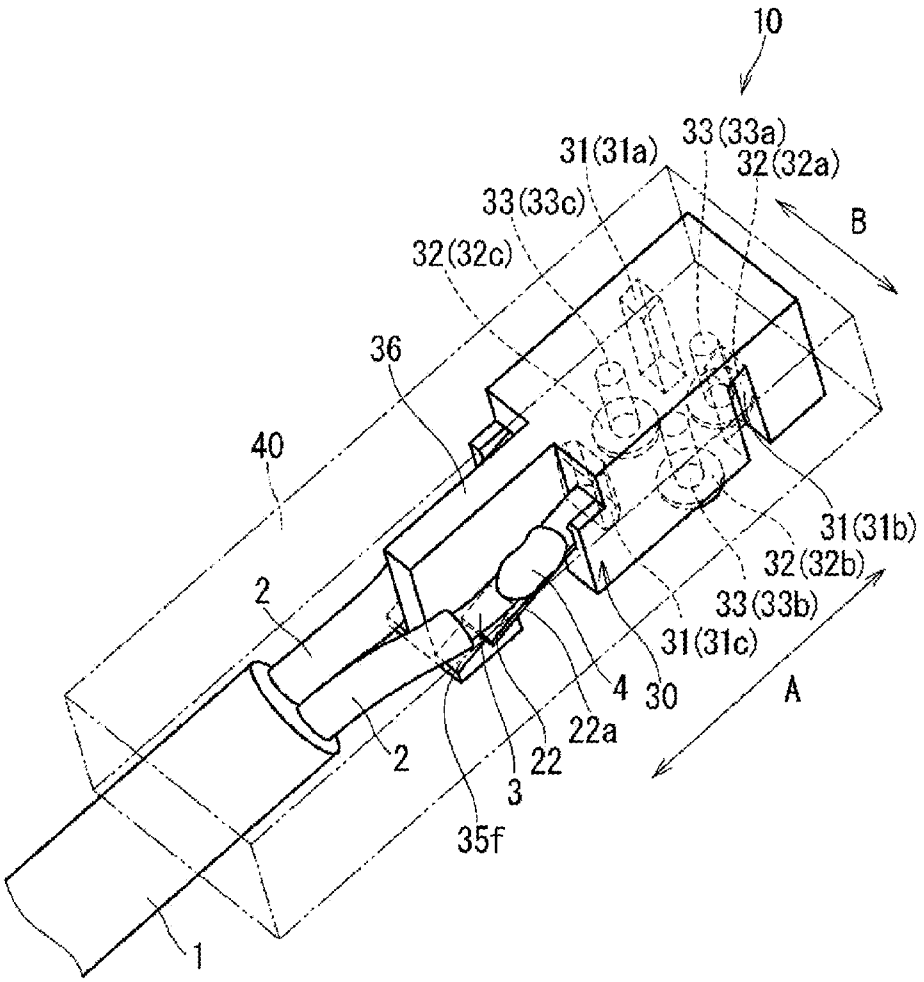
FIG. 2 is a perspective view of the composite molded component.
Figure 3:
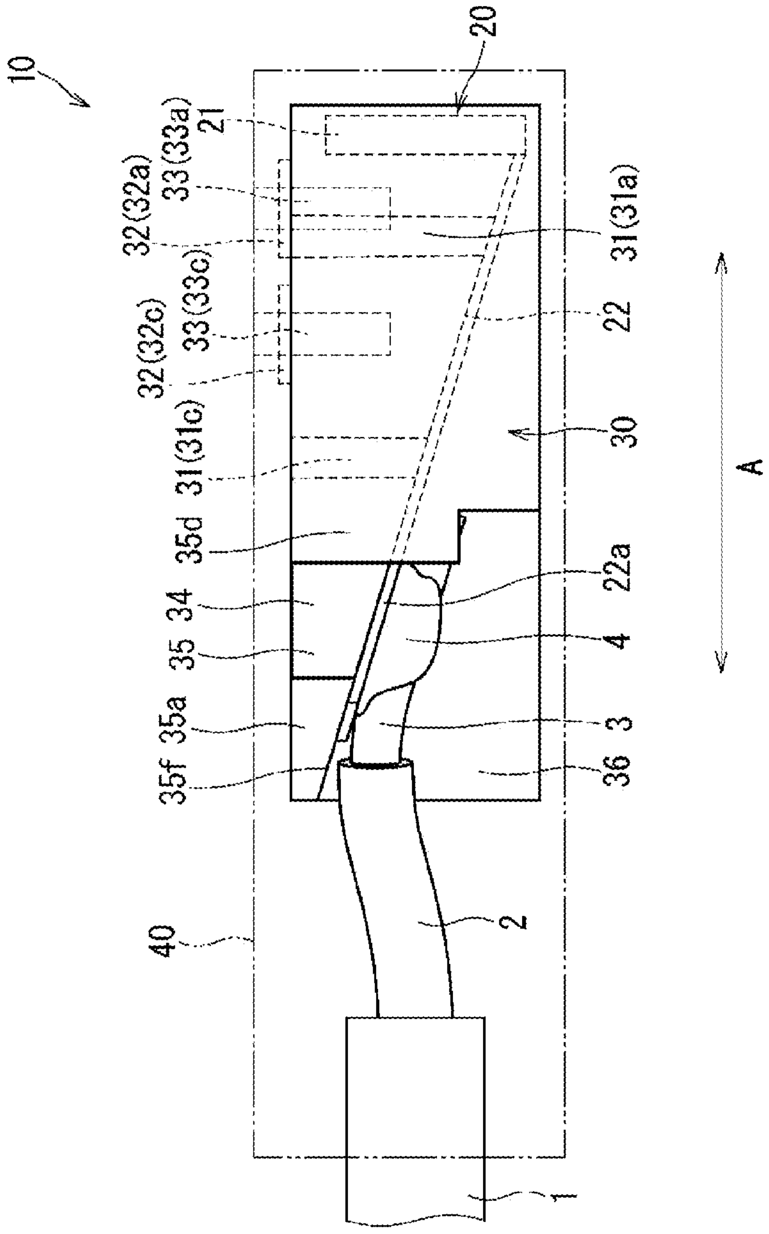
FIG. 3 is a side view of the composite molded component.

A composite molded component 10 according to a first embodiment will be described below. FIG. 1 is a perspective view of the composite molded component 10. FIG. 2 is a perspective view of the composite molded component 10 from a different direction than FIG. 1. FIG. 3 is a side view of the composite molded component 10. Note that in all of these drawings, a secondary molded portion 40 is shown by virtual lines.

Composite Molded Component 10

The composite molded component 10 includes an internal component 20, a primary molded portion 30, and a secondary molded portion 40. The composite molded component 10 is used to measure the rotational speed of a vehicle tire, for example.

Internal Component 20

The internal component 20 includes an element body portion 21, which serves as the electronic component body, and lead wires 22. In the present embodiment, the internal component 20 includes two lead wires 22 arranged parallel with each other with an interval therebetween. The lead wires 22 are shaped as rectangular plates. Each of the lead wires 22 has a leading end portion that is exposed from the primary molded portion 30. A portion of the leading end portion of the lead wire 22 exposed from the primary molded portion 30 is a soldering portion 22*a*. The soldering portion 22*a* is the portion to be soldered to a conductor end portion 3. The conductor end portion 3, which is the leading end portion of a coated electric wire 1, is fixed to the soldering portion 22*a* by solder 4. The conductor end portion 3 is the portion where an insulating coating 2 covering the conductor has been stripped off to expose the conductor. After the lead wires 22 and the conductor end portions 3 are secured together, the internal component 20 and the primary molded portion 30 are molded using a secondary molded portion 40. In the present embodiment, the element body portion 21 is shaped as a flattened rectangular parallelepiped. A plurality of (here, two) lead wires 22 extend from one peripheral side portion of the element body portion 21. The base end portions of the lead wires 22 extend from the element body portion 21 toward one side in the thickness direction. The lead wires 22 extend obliquely relative to the upper surface of the element body portion 21. The lead wires 22 may be orthogonal to or parallel with the upper surface of the element body portion 21.

The element body portion 21 detects a magnetic physical quantity or an amount of change thereof, for example. The value detected by the element body portion 21 is transmitted to a control unit (not shown) and used to measure the rotational speed of a wheel, for example. The element body portion 21 has a rectangular shape, for example. In the following description, the lengthwise direction of the secondary molded portion 40 refers to the longest direction among three directions parallel with respective sides of the rectangular parallelepiped-shaped secondary molded portion 40, envisioning the state where the internal component 20 is covered by the primary molded portion 30 and the secondary molded portion 40. Specifically, the element body portion 21 is held by the primary molded portion 30, and the element body portion 21 and the primary molded portion 30 are covered by the secondary molded portion 40. The element body portion 21 is embedded in a portion near one end of the secondary molded portion 40 in the lengthwise direction, and the lead wires 22 extends toward the other end of the secondary molded portion 40 in the lengthwise direction. In other words, the secondary molded portion 40 is elongated in one direction in order for the element body portion 21 to be housed in one end portion and the lead wires 22 to be housed in the other end portion. The lengthwise direction of the secondary molded portion 40 may be considered to be the direction that connects the portion that houses the element body portion 21 and the portion that houses the lead wires 22. In the figures, the lengthwise direction of the secondary molded portion 40 is indicated by an arrow A.

Primary Molded Portion 30

Figure 4:
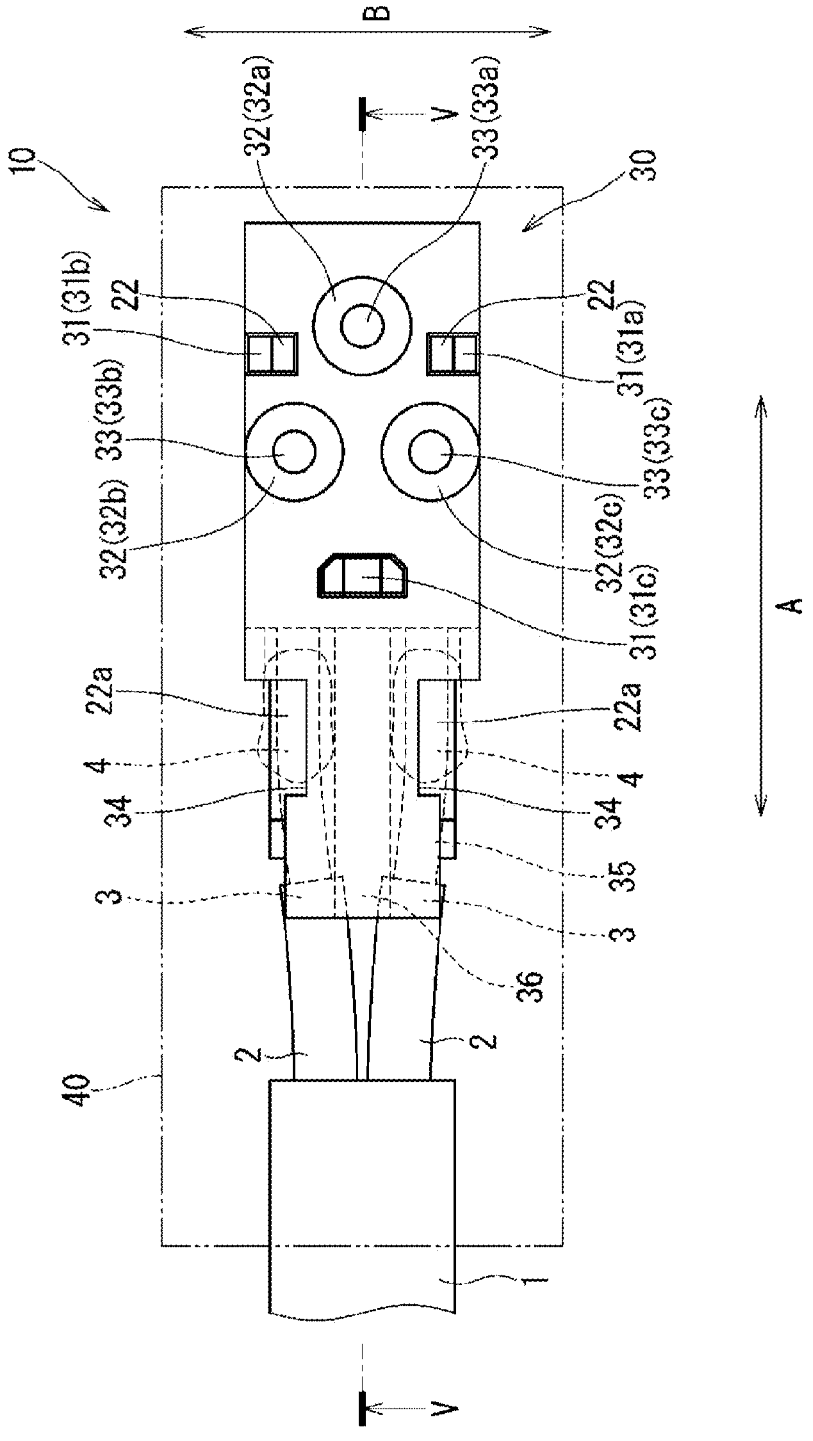
FIG. 4 is a plan view of the composite molded component.
Figure 5:
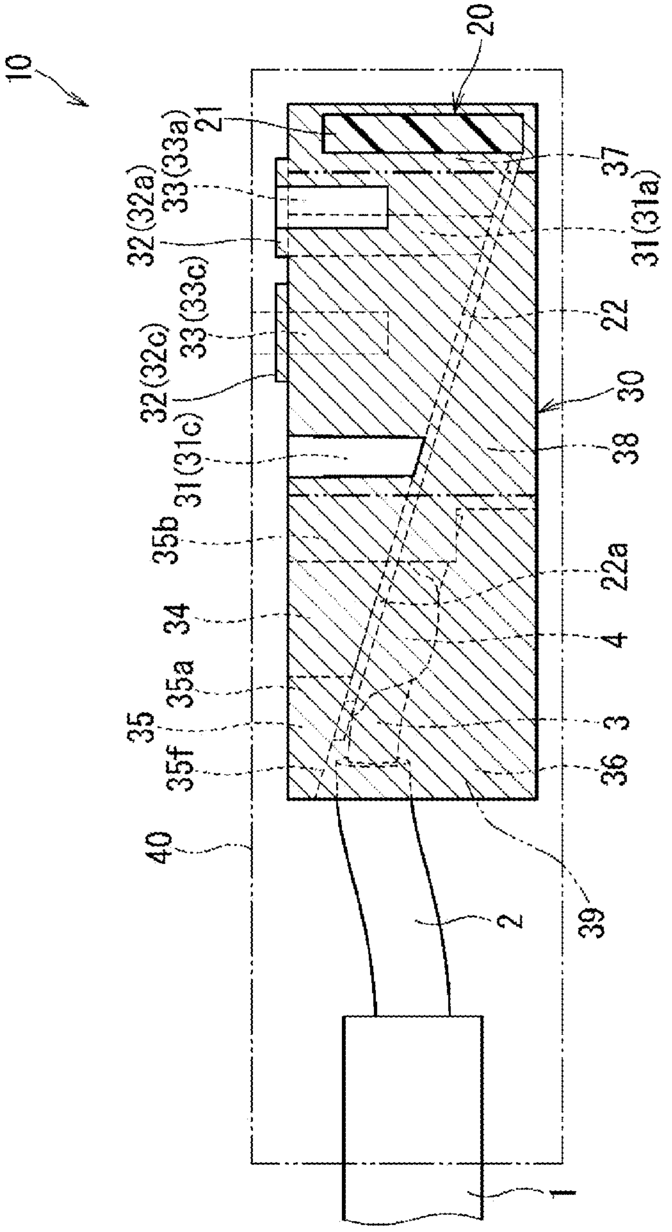
FIG. 5 is a cross-sectional view taken along a line V-V in FIG. 4.

FIG. 4 is a plan view of the composite molded component 10. Also, FIG. 5 is a cross-sectional view taken along a line V-V in FIG. 4. The primary molded portion 30 is a resin portion that covers the internal component 20. The primary molded portion 30 is a portion die-molded using a resin material and using the internal component 20 as an insert. The primary molded portion 30 includes through hole portions 31 that penetrate to the internal component 20, and annular rib portions 32.

More specifically, the primary molded portion 30 includes a body housing portion 37, a lead wire base end housing portion 38, and a lead wire exposed portion holding portion 39. The body housing portion 37 covers the element body portion 21. The lead wire base end housing portion 38 is continuous with the side of the body housing portion 37 from which the lead wires 22 extend. The body housing portion 37 and the lead wire base end housing portion 38 are shaped as a rectangular parallelepiped. The base end portion of the lead wire 22 is embedded in the body housing portion 37.

The lead wire exposed portion holding portion 39 extends from the lead wire base end housing portion 38 on the side opposite to the body housing portion 37. The lead wire exposed portion holding portion 39 includes placement portions 35 and a partition portion 36. In the present embodiment, the lead wire exposed portion holding portion 39 includes two placement portions 35 in correspondence with the two lead wires 22.

More specifically, the two placement portions 35 extend from the lead wire base end housing portion 38 on the side opposite to the body housing portion 37. Each of the placement portions 35 has a placement surface 35*f* that extends along one surface of the corresponding lead wire 22. The lead wires 22 are placed on the corresponding placement surfaces 35*f*. The two placement surfaces 35*f* extend parallel with each other along corresponding surfaces of the two lead wires 22. Due to the primary molded portion 30 having such placement portions 35, the lead wires 22 are supported in a stable state. Therefore, when the lead wires 22 are soldered, the soldering can be performed more easily. In other words, the lead wires 22 can be soldered more easily.

Also, a partition portion 36 extends between the placement surfaces 35*f* so as to separate the lead wires 22 extending from the lead wire base end housing portion 38. The two lead wires 22 are separated by the partition portion 36, thus preventing the lead wires 22 from coming into contact with each other.

A recessed portion 34 that forms a gap with the corresponding lead wire 22 is formed in at least the portions of the primary molded portion 30 that face the soldering portions

22*a*. In the present embodiment, the recessed portion 34 is formed in each of the placement portions 35.

In the present embodiment, the recessed portions 34 do not have a bottom in a plan view. It is not essential that the recessed portions 34 do not have a bottom, and the recessed portions 34 may have a bottom surface spaced apart from the corresponding soldering portion 22*a*. Due to gaps being formed between the primary molded portion 30 and the lead wires 22 by the recessed portions 34, the effect of heat during soldering can be avoided. This reduces the effect that heat generated by the soldering tool has on the primary molded portion 30. Therefore, when the lead wires 22 and the conductor end portions 3 are soldered, the heat generated by the soldering tool is prevented from being transmitted to the resin of the primary molded portion 30 in the vicinity of the soldering tool, and melting of the resin of the primary molded portion 30 is avoided.

If the resin of the primary molded portion 30 melts due to the effect of heat generated by the soldering tool, the melted resin may cool and harden, resulting in a protrusion. Such a resin protruding portion may cause rattling when the internal component 20 and the primary molded portion 30 are set in a mold for secondary molding. Also, there are cases where the internal component 20 and the primary molded portion 30 cannot be set in the mold for secondary molding.

In contrast, if the recessed portions 34 are formed and melting of the primary molded portion 30 caused by heat generated by the soldering tool is prevented, melting of the resin of the primary molded portion 30 is prevented, and the accuracy of the primary molded portion 30 is improved. This allows the internal component 20 and the primary molded portion 30 to be smoothly set in the mold during secondary molding. Therefore, the productivity of the composite molded component 10 is improved.

As shown in FIG. 4, the recessed portions 34 each have a rectangular shape in a plan view, for example. Therefore, the mold for forming the primary molded portion 30 can be produced easily. The recessed portions 34 are located at the outer ends of the secondary molded portion 40 in the width direction (arrow B direction) perpendicular to the lengthwise direction (arrow A direction; in the present embodiment, the lengthwise direction of the primary molded portion 30). In other words, due to the recessed portions 34 being located at the outer ends of the primary molded portion 30, the recessed portions 34 can be formed easily. In other words, the shape of the primary molded portion 30 is simplified. Also, the outer ends of the primary molded portion 30 in the width direction are portions that face positions suited to soldering. In other words, the recessed portions 34 are provided at positions particularly likely to be subjected to heat generated by the soldering tool. Therefore, this arrangement of the recessed portions 34 makes it possible to avoid the melting of resin in the portions likely to be subjected to heat generated by the soldering tool. The placement surfaces 35*f*, which are narrower than the other portions, are located in the recessed portions 34. Therefore, the lead wires 22 are placed on the placement surfaces 35*f* inside the recessed portions 34. Accordingly, the lead wires 22 are stably supported.

The recessed portions 34 are each formed at a position corresponding to an intermediate portion of the corresponding soldering portion 22*a*, for example. Furthermore, it is preferable that the recessed portion 34 is located at a position corresponding to a center portion of the soldering portion 22*a*. The intermediate portion of the soldering portion 22*a* refers to the portion where the lead wire 22 is soldered, excluding the two end portions in the lengthwise direction of the secondary molded portion 40. The center portion of the soldering portion 22*a* refers to the center portion, with respect to the lengthwise direction of the secondary molded portion 40, of the portion to which the lead wire 22 is soldered. The recessed portion 34 only needs to be overlapped with at least a portion of the center portion of the soldering portion 22*a*. The recessed portions 34 are formed in the primary molded portion 30 at positions facing the rear side of the surfaces to which the lead wires 22 are soldered. Here, it is envisioned that soldering is performed by applying heat mainly to the lengthwise intermediate portions of the lead wires 22. Therefore, the intermediate portion of the soldering portion 22*a* is considered to be the region likely to be approached by the soldering tool, and the center portion of the soldering portion 22*a* is considered to be the region most likely to be approached by the soldering tool. Since the recessed portion 34 is provided at a position corresponding to the intermediate portion (or center portion) of the soldering portion 22*a*, it is possible to avoid melting of the resin in a predetermined portion of the primary molded portion 30 that is most susceptible to the effect of the soldering tool.

The portion of each of the placement portions 35 that is on the leading end side of the recessed portion 34 is a leading-end placement portion 35*a*. The leading end portion of the lead wire 22 is placed on the leading-end placement portion 35*a*. The portion of the placement portion 35 that is on the base end side of the recessed portion 34 is a base-end placement portion 35*b*. The lead wire 22 is placed on and supported by the leading-end placement portion 35*a* and the base-end placement portion 35*b*, which are in front of and behind the recessed portion 34, and thus the lead wire 22 is stably supported. Therefore, when the lead wires 22 are soldered, the soldering can be performed more easily. In other words, the lead wires 22 can be soldered more easily. Also, since the surface of the lead wire 22 on the other side is exposed on the base-end placement portion 35*b*, heat generated by soldering is easily dissipated before being transmitted to the element body portion 21.

It is preferable that the leading end portion of the lead wire 22 is placed on the leading-end placement portion 35*a* so as to entirely fit on the leading-end placement portion 35*a* and not protrude from the leading-end placement portion 35*a*. As a result, the outer shape of the assembly of the internal component 20 and the primary molded portion 30 (particularly the outer shape of the leading end side of the placement portion 35) is likely to be stable regardless of error in the length of the lead wire 22, positioning error of the lead wire 22 in the internal component 20, and the like.

When the primary molded portion 30 is molded using the internal component 20 as an insert, the through hole portions 31 are marks formed by the insertion of positioning portions of the mold. The through hole portions 31 penetrate until they reach the upper surface of the internal component 20, and portions of the upper surface of the internal component 20 are exposed in the through hole portions 31. In the present embodiment, the through hole portions 31 are formed in the lead wire base end housing portion 38. Although there are no limitations on the number of through hole portions 31, in the present embodiment, a first through hole portion 31*a*, a second through hole portion 31*b*, and a third through hole portion 31*c* are provided.

The following describes the annular rib portions 32. When molding the secondary molded portion 40 using the primary molded portion 30 as an insert, heated and melted resin for molding the secondary molded portion 40 is injected into the mold apparatus. The heated and melted resin rapidly cools and solidifies upon coming into contact with the surface of the primary molded portion 30. The heated and melted resin that comes into contact with the leading end portions of the annular rib portions 32 does not cool as rapidly as the resin that comes into contact with other portions of the surface of the primary molded portion 30. Therefore, it is expected that the heated and melted resin for forming the secondary molded portion 40 will melt together with the leading end portions of the annular rib portions 32. This results in more complete water stoppage along the annular rib portions 32 at the boundary between the primary molded portion 30 and the secondary molded portion 40. Such annular rib portions 32 are sometimes called melt ribs. It is preferable that the primary molded portion 30 and the secondary molded portion 40 are formed using the same material so that the annular rib portions 32 and the secondary molded portions 40 can easily melt together.

The annular rib portions 32 protrude toward the secondary molded portion 40 so as to surround positioning portions 33 of the primary molded portion 30. When the secondary molded portion 40 is molded using the internal component 20 and the primary molded portion 30 as inserts, the positioning portions 33 are recessions into which positioning portions of the mold are fitted. Although there are no limitations on the number of positioning portions 33, in the present embodiment, the positioning portions 33 include a first positioning portion 33*a*, a second positioning portion 33*b*, and a third positioning portion 33*c*. The annular rib portions 32 include a first annular rib portion 32*a* that surrounds the first positioning portion 33*a*, a second annular rib portion 32*b* that surrounds the second positioning portion 33*b*, and a third annular rib portion 32*c* that surrounds the third positioning portion 33*c*. As shown in FIG. 5, the second annular rib portion 32*b* and the third annular rib portion 32*c* are positioned side by side along the width direction of the internal component 20 (parallel direction of the lead wires 22: direction of arrow B) at positions different from the first annular rib portion 32*a* in the lengthwise direction (arrow A direction) of the secondary molded portion 40. In the present embodiment, the first through hole portion 31*a* is located closer to the element body portion 21 than the second annular rib portion 32*b* and the third annular rib portion 32*c* are.

The first positioning portion 33*a* is located at the center of the internal component 20 in the width direction (arrow B direction), for example. The second positioning portion 33*b* and the third positioning portion 33*c* are located on opposite sides of the center of the internal component 20 in the width direction (arrow B direction). Also, the second positioning portion 33*b* and the third positioning portion 33*c* are equidistant from the center of the internal component 20 in the width direction (arrow B direction). In other words, the positioning portions 33 are positioned symmetrically about a center line of the internal component 20 in the width direction (arrow B direction). This reduces bias, in the width direction (arrow B direction) of the internal component 20, in the support force by which the primary molded portion 30 is supported by the mold during molding of the secondary molded portion 40. In the present embodiment, the annular rib portions 32 are formed so as to surround the corresponding positioning portions 33, and thus the annular rib portions 32 are also positioned symmetrically about the center line of the internal component 20 in the width direction (arrow B direction).

As shown in FIG. 5, at least a portion of each of the through hole portions 31 and at least a portion of the corresponding annular rib portion 32 are overlapped with each other in the lengthwise direction of the secondary molded portion 40. In the present embodiment, the first through hole portion 31*a* and the second through hole portion 31*b* are located on opposite sides of the first annular rib portion 32*a* in the width direction (arrow B direction), which is perpendicular to the lengthwise direction (arrow A direction) of the secondary molded portion 40. At least a portion of the arrangement region of the through hole portion 31 in the coordinate system along the lengthwise direction (arrow A direction) of the secondary molded portion 40 is overlapped with at least a portion of the arrangement region of the annular rib portion 32. By adopting such an arrangement, the composite molded component 10 can be shortened in the lengthwise direction of the secondary molded portion 40 (the direction of the arrow A). Accordingly, the composite molded component 10 can be made smaller overall.

In the present embodiment, the first through hole portion 31*a* and the second through hole portion 31*b* are positioned on opposite sides of the center of the internal component 20 in the width direction (arrow B direction). The first through hole portion 31*a* and the second through hole portion 31*b* are equidistant from the center of the internal component 20 in the width direction (arrow B direction). Due to the positions of the first through hole portion 31*a* and the second through hole portion 31*b*, it is possible to reduce bias in the supporting force by which the internal component 20 is supported by the mold during molding of the primary molded portion 30.

Also, the third through hole portion 31*c* is located at a position different from the first through hole portion 31*a* and the second through hole portion 31*b* in the lengthwise direction (arrow A direction) of the secondary molded portion 40. In the present embodiment, the third through hole portion 31*c* is located closer to the leading end portions of the lead wires 22 than the first through hole portion 31*a* and the second through hole portion 31*b* are. The third through hole portion 31*c* is located at the center of the internal component 20 in the width direction (arrow B direction), for example. In other words, the through hole portions 31 are positioned symmetrically across a center line of the internal component 20 in the width direction (arrow B direction). This reduces bias, in the width direction (arrow B direction) of the internal component 20, in the support force by which the internal component 20 is supported by the mold during molding of the primary molded portion 30.

Also, as shown in FIGS. 1 and 4, the first through hole portion 31*a*, the second through hole portion 31*b*, and the third through hole portion 31*c* penetrate at positions where portions of the lead wires 22 are exposed through the primary molded portion 30. Due to the arrangement of the first through hole portion 31*a*, the second through hole portion 31*b*, and the third through hole portion 31*c*, the lead wires 22 are stably supported by the positioning portions of the mold during molding of the primary molded portion 30. Note that the third through hole portion 31*c* is a hole wider than the distance between the two lead wires 22, and exposes inward-facing portions of the two lead wires 22. Due to the position and shape of the third through hole portion 31*c*, the lead wires 22 are stably supported by a positioning pin of the mold during molding of the primary molded portion 30.

According to the composite molded component 10 configured as described above, at least a portion of each of the lead wires 22 is the soldering portion 22*a* that is to be soldered to another component (conductor end portion 3), and the primary molded portion 30 includes, in at least portions of the portions that face the soldering portions 22*a*, the recessed portions 34 that each form a gap with the corresponding lead wire 22. Therefore, due to the provision of the recessed portions 34 that form gaps with the lead wires 22, the effect of heat generated by the soldering tool can be avoided. This reduces the effect that heat generated by the soldering tool has on the primary molded portion 30.

Furthermore, the recessed portions 34 are located at the outer ends of the secondary molded portion 40 in the width direction (arrow B direction in FIG. 4) perpendicular to the lengthwise direction (arrow A direction in FIG. 4), and thus the recessed portions 34 can be formed easily. Also, the outer ends of the primary molded portion 30 in the width direction are portions that face positions suited to soldering. In other words, the primary molded portion 30 is provided with the recessed portions 34 at positions particularly likely to be subjected to heat generated by the soldering tool. Therefore, this arrangement of the recessed portions 34 makes it possible to avoid the melting of resin in the portions likely to be subjected to heat generated by the soldering tool.

Also, the recessed portions 34 are each formed at a position corresponding to the intermediate portion of the corresponding soldering portion 22*a*. Therefore, melting of the resin in the primary molded portion 30 caused by the heat generated by the soldering tool is avoided.

Also, the primary molded portion 30 includes the leading-end placement portions 35*a* on which the leading end portions of the lead wires 22 are placed. Therefore, the lead wires 22 are supported in a stable state. Therefore, when the lead wires 22 are soldered, the soldering can be performed more easily. In other words, the lead wires 22 can be soldered more easily.

Other Matter

Although the recessed portions 34 have a rectangular shape in a plan view in the embodiment described above, the recessed portions 34 are not limited to having a rectangular shape in a plan view. The recessed portions 34 may have a shape bounded by a curved line or a polygonal shape in a plan view. The present disclosure also encompasses any recessed portion that forms a gap with the corresponding lead wire 22 in at least a portion. Also, although the recessed portions 34 do not have a bottom in a plan view, the present disclosure is not limited to this. The present disclosure also encompasses any recessed portion that forms a gap with the corresponding lead wire 22 in at least a portion, even if the recessed portion has a bottom in a plan view.

The configurations described in the first embodiment and variations thereof can be combined as appropriate as long as no contradiction arises.

The invention claimed is:

1. A composite molded component comprising:

an internal component including an electronic component body and at least one lead wire extending from the electronic component body;

a primary molded portion covering the internal component; and a secondary molded portion covering the primary molded portion, wherein at least a portion of the at least one lead wire is a soldering portion configured to be soldered to another component, and the primary molded portion includes, in at least a portion of a portion facing the soldering portion, a recessed portion forming a gap with the at least one lead wire.

2. The composite molded component according to claim 1, wherein the at least one lead wire includes a pair of lead wires, and the primary molded portion includes the recessed portion at each of two outer ends in a width direction perpendicular to a lengthwise direction of the secondary molded portion.

3. The composite molded component according to claim 1, wherein the recessed portion is formed at a position corresponding to an intermediate portion of the soldering portion.

4. The composite molded component according to claim 1, wherein the primary molded portion includes a leading-end placement portion on which a leading end portion of the at least one lead wire is placeable.

5. The composite molded component according to claim 2, wherein the recessed portion is formed at a position corresponding to an intermediate portion of the soldering portion.

6. The composite molded component according to claim 2, wherein the primary molded portion includes a leading-end placement portion on which a leading end portion of the at least one lead wire is placeable.

7. The composite molded component according to claim 3, wherein the primary molded portion includes a leading-end placement portion on which a leading end portion of the at least one lead wire is placeable.

* * * * *